United States Patent [19]

Glaudel et al.

[11] Patent Number: 4,689,736
[45] Date of Patent: Aug. 25, 1987

[54] DISTRIBUTED PROCESS CONTROL SYSTEM

[75] Inventors: Stephen P. Glaudel, Harleysville; Paul H. Grissom, Furlong, both of Pa.

[73] Assignee: General Signal Corporation, Stamford, Conn.

[21] Appl. No.: 614,176

[22] Filed: May 29, 1984

[51] Int. Cl.$^4$ ............................................. G06F 13/00
[52] U.S. Cl. .................................................... 364/140
[58] Field of Search ............... 364/200, 900, 186, 187, 364/140, 138

[56] References Cited

U.S. PATENT DOCUMENTS

| | | | |
|---|---|---|---|
| 4,189,765 | 2/1980 | Kotalik et al. | 364/900 |
| 4,296,464 | 10/1981 | Woods et al. | 364/200 |
| 4,303,973 | 12/1981 | Williamson, Jr. et al. | 364/189 |

*Primary Examiner*—Gareth D. Shaw
*Assistant Examiner*—John G. Mills
*Attorney, Agent, or Firm*—Harold Huberfeld; William G. Miller, Jr.

[57] ABSTRACT

A method and apparatus for carrying out the control of a process using a distributed process controller wherein each controller receives during consecutive time slots of a scan cycle inputs from the process representing measured values of process variables to be controlled by the control loops of the system. Control is provided by the use of a preselected algorithm in each of the slots with the output of that algorithm being used to control certain of the loops or to provide input to another slot or to a control program. Control programs which can be written by the user are run sequentially in the background to provide additional loops of control or inputs to the slots so that the number of algorithms which can be used is increased without drastically increasing the equipment required.

2 Claims, 4 Drawing Figures

DISTRIBUTED PROCESS CONTROL SYSTEM

BACKGROUND OF THE INVENTION

The present invention relates to digital distributed process control systems which have controllers or control stations at each of a number of distributed locations with each controller controlling a plurality of control loops. More particularly, this invention relates to a method and apparatus for carrying out a required control strategy for the loops at any one location with a maximum of flexibility in the type of strategy to be executed while at the same time minimizing the cost per loop.

The control of complex industrial processes has evolved from the use of a large number of simple single-loop controllers, which either perform without central direction or, alternatively, are directed by a central computer, toward the use of distributed systems. In distributed systems, widely spaced control stations are connected for communication with one another and, if desired, with a host computer. Each of the stations usually is capable of controlling a large number of loops and is microprocessor based with the host computer being employed for complex computing, control, and storage functions beyond the capability of the stations.

The individual stations of distributed control systems typically execute control on a number of loops by either of two general approaches. The first is the use of time slots during which are executed selected library algorithms which determine the functional relationship between measured variables (controller inputs) and controlled variables (controller outputs) of the process loops. The second is the use of user-entered programs to determine those functional relationships.

With the time slot approach a fixed number of slots is established for each scan period during which the controller inputs the measured variables and supplies the control signals to the control elements of the loops. Each slot can be used to execute any one of a number of common algorithms stored as firmware in a library of algorithms. The output for each of the slots can alternatively be used as a control output to an associated loop or as an input to another slot where supplementary processing of the control signal can be carried out before the signal is used for control of a loop. This approach has some severe limitations, however, when it is desired to apply it to the extremely diverse combinations of control strategies which may be required in an industrial environment. Thus, for example, where the library of algorithms includes a standard PID algorithm to provide proportional, integral, and derivative functions as well as a summing algorithm, a multiplying algorithm, and a full range of algorithms for logic functions, it will be evident that, while the PID algorithm may make efficient use of the time for one slot, the less complex algorithms may not. Thus, the execution of non-standard control strategies which require a number of summers and multipliers or a number of logic functions, will not use the limited number of slots efficiently.

In the user-entered program approach separate programs are established for each loop to provide the desired control strategy for that loop. The programs are sequentially run to provide each loop in turn with a control signal. While this approach has a maximum flexibility the time required for one cycle through the loops may be excessive where frequent control action is necessary and the control strategy is complex. Thus, a complex PID algorithm may be efficiently handled in the slot approach but it is not so efficiently handled in the program approach. It is, therefore an object of this invention to provide a control execution which can efficiently handle both complex and simple strategies to maximize the number of loops which can be handled by each controller.

SUMMARY OF THE INVENTION

In accordance with the present invention there is provided a method and means for carrying out the control of a process using a plurality of control loops in a digital distributed process control system. This method includes providing a database having a plurality of memory cells for storing numerical and boolean values for use in the control of the loops and providing in firmware a library of frequently used control algorithms which can be sequentially executed to produce an algorithm output which is a predetermined function of selected algorithm inputs obtained from the database. There is a scanning of a plurality of time slots during each of which the station controller is assigned to produce an algorithm output in accordance with a predetermined function of the algorithm inputs associated with that slot, as determined by the algorithm selected for that slot. Concurrently established sequential programs are executed to provide other control strategies. These programs are run to provide a program output to the database having a predetermined functional relationship to program inputs from the database. Each algorithm output and program output is used as either a controller output or as a value to be stored in said database for use as an algorithm input for another slot or a program input for another program. The controller input to the database is used as a program input or as an algorithm input, whereby the control elements of the process are controlled in accordance with the desired strategy as established by the algorithms associated with the time slots and by the sequential programs.

DETAILED DESCRIPTION OF THE PREFERRED EMBODIMENT

Figure 1:
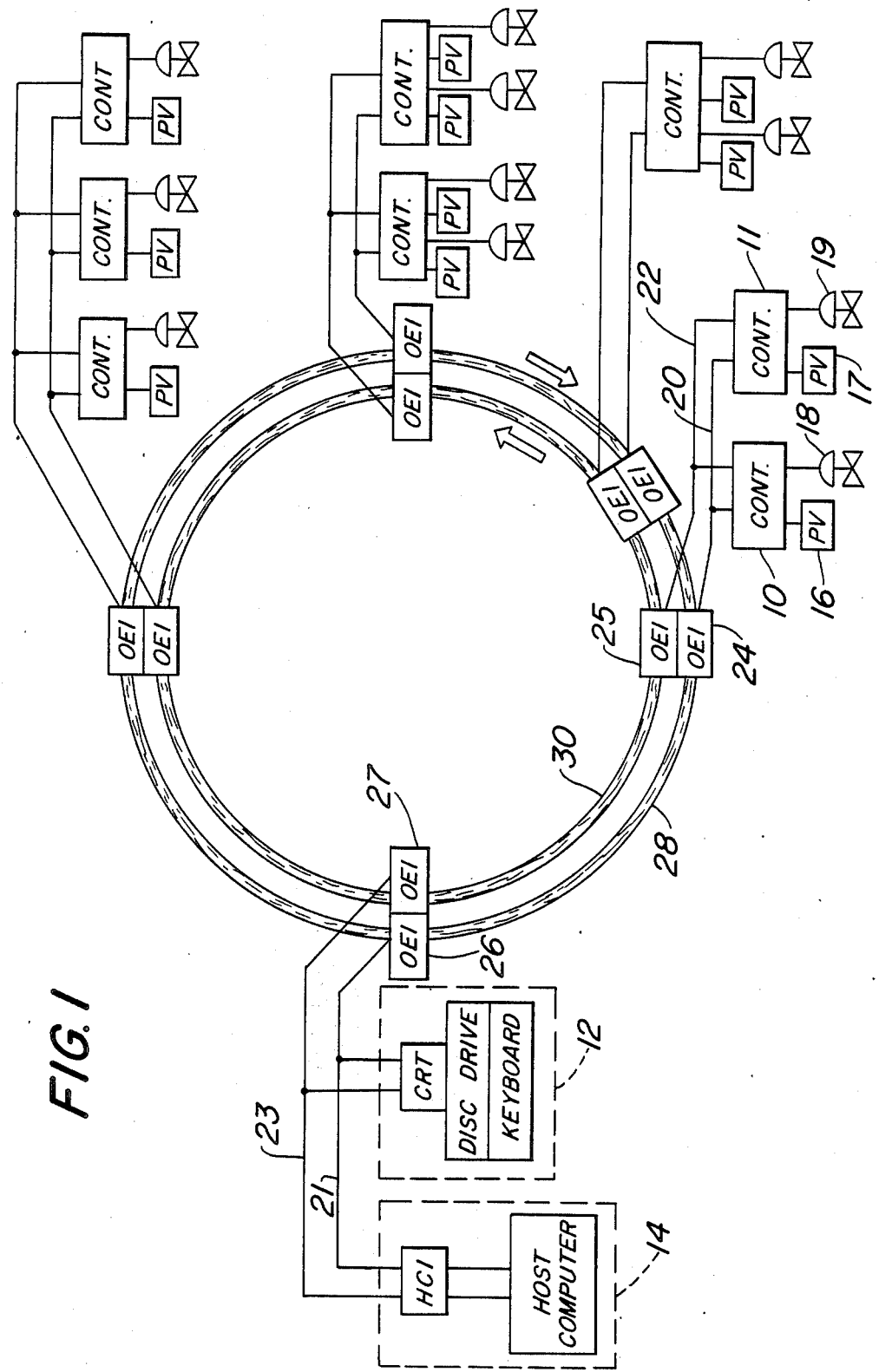
FIG. 1 illustrates a distributed process control system of the type for which this invention is useful.

In FIG. 1 there is illustrated a system such as can be used for distributed process control utilizing the present invention. This system is shown as including a number of stations such as the controller stations 10 and 11, the operator station 12, and a host computer station 14. The controller stations are shown as receiving inputs relating to the magnitude of process variables PV from measuring units such as 16 and 17, and producing a control signal to associated control valves such as 18 and 19 for the control of the loops of the process.

The controller stations are shown in groups, each group being at a different control location. The groups are interconnected by a redundant multi-drop type electrical data network made up of a pair of cables such as 20 and 22. These local data highways or networks are each connected to a corresponding node, such as nodes 24, 25, 26, and 27, of the dual simplex optical repeater ring making up the global data highway, shown as fiber optic cables 28 and 30. The nodes of the global highway are each an Optical-Electrical Interface (OEI) which couples the local electrical network cables such as 20 and 22, with the global fiber optical cables 28 and 30.

As shown in FIG. 1, the optical data highways 28 and 30 are arranged so that the transmitters of the OEIs carry data in opposite directions around the individual rings which can be conveniently referred to as "clockwise" and "counterclockwise" rings. In the same sense the cables 20 and 22 can be referred to as "clockwise" and "counterclockwise".

In the event that there is an interruption in either of the rings as by the inoperability of an OEI transmitter, then communication is provided by the other ring. Also, in the event that both optical cables are broken in the same location, there is still continuity of communication.

The operator's station 12 and host computer station 14 are connected to the global highways by a pair of local data network cables 21 and 23 and repeater nodes 26 and 27. The operator's station will normally include a smart terminal having a cathode-ray tube monitor and a keyboard input with the appropriate microprocessor and associated elements such as disk drives to provide for interfacing an operator with the system, for monitoring and other operating functions. The operator's station will also frequently include a printer.

The host computer is shown connected to a local data network by the host computer interface HCI. The host computer can, of course, be used for a number of calculating and controller functions as well as for the collection of data. In many process control applications the host computer can be omitted.

With communications systems such as that shown in FIG. 1 each of the control stations would typically be able to communicate with the host computer or with the operator station as well as with another control station. Likewise, the host computer and the operators station can communicate with the control stations or between themselves. Additional smaller and less sophisticated operator stations may be associated with each of the local data networks as a means for supplying data displays of the operations on the local network.

The global data highway system of FIG. 1 may typically be a high speed, high data rate, real time communications network. It may, for example, be designed to operate with 31 nodes in the global optical highway, spanning distances on the order of 20,000 ft. with a maximum of 7,000 ft. between adjacent optical-electrical interface nodes. The local networks connected to the nodes may, for example, connect between stations over a distance of 200 feet and data may be transmitted from this network at rates on the order of 500,000 bits per second.

Figure 2:
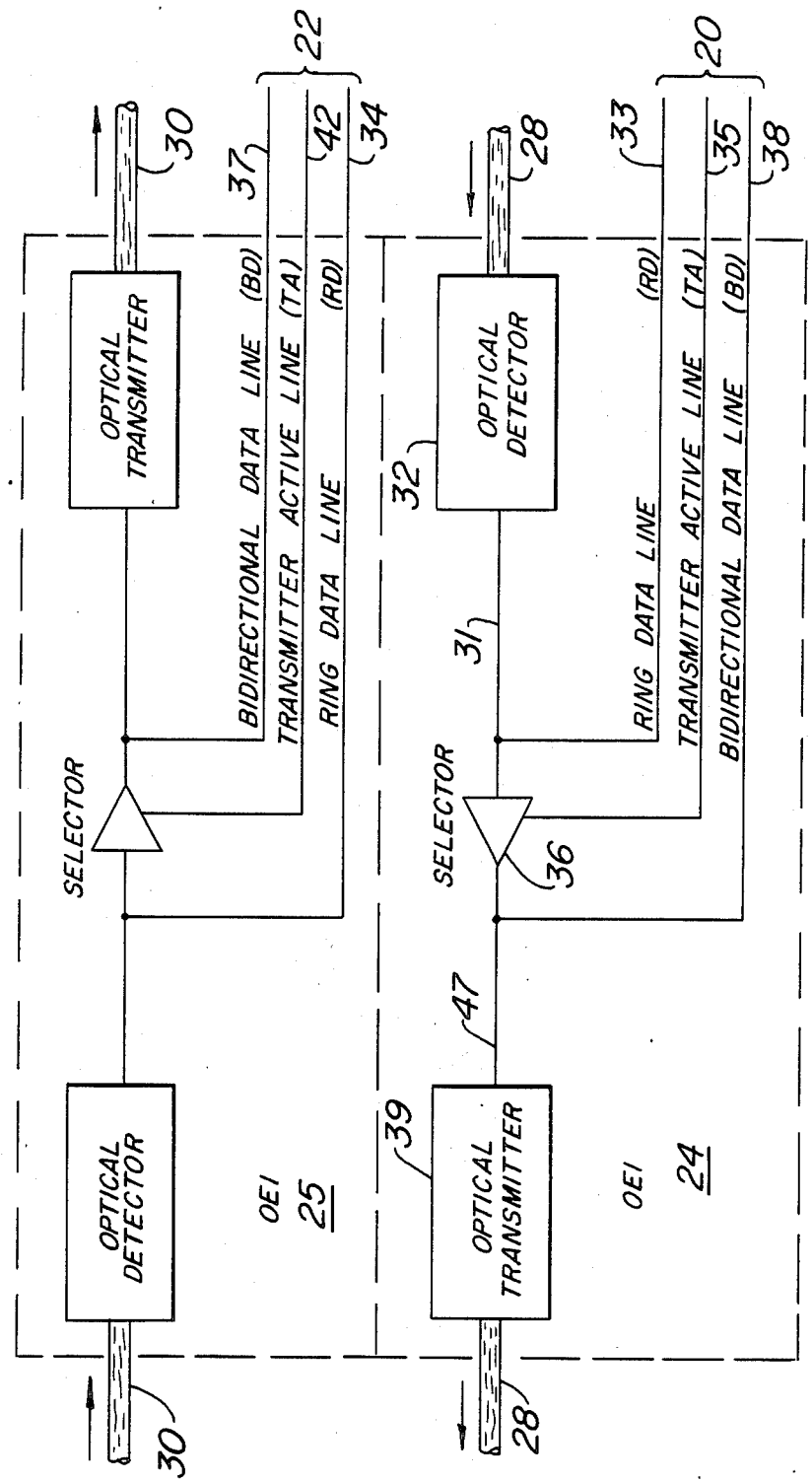
FIG. 2 illustrates an optical-electrical interface of the type which can be used in the arrangement of FIG. 1.

FIG. 2 shows in more detail one form for the Optical-Electrical Interfaces such as 24 and 25. These units each have one transmitter-receiver combination. Each transmitter-receiver combination converts optical data from the ring to an electrical form and back again to the optical form for retransmission. Thus, the optical detector 32 is a receiver which receives data from the fiber optic highway 28 in the clockwise direction and converts it to electrical data on line 31. If neither of the stations 10 and 11 connected to the local network lines 20 and 22 is transmitting, then the signal received by 32 passes through selector 36 to line 47 for retransmission by optical transmitter 39 over optical fiber 28 to the next Optical-Electrical Interface 26 and so on around the global highway ring. This continues until the signal arrives at an Optical-Electrical Interface which is connected to a local data network having a station which is transmitting. To prevent the formation of an endless loop in the global highway the Optical-Electrical Interface having a transmitting station connected to its local highway is conditioned by a signal on the transmitter active line so as not to retransmit the received signal.

Each of the two cables 20 and 22 contains three twisted, shielded pairs, each of which is a balanced multipoint interconnection. Each station in the system, such as station 10, contains a modem, such as 40 of FIG. 3, which can advantageously be constructed to have two receiver circuits and a common transmitter circuit for communicating between the data bus 46 of the station and the data highways 20 and 22, interconnecting the stations. The receiver circuits can be termed "clockwise" and "counterclockwise" and, along with the associated transmitter can be connected to the respective cables 20 and 22.

A modem which is useful in the present invention is described in U.S. patent application Ser. No. 528,356, filed Aug. 31, 1983 and now U.S. Pat. No. 4,569,060. That modem is usually in the receive mode and works on a "first in" principle, whereby it locks onto the first cable which produces an acceptable carrier. When it locks onto a cable it decodes the serial data (message) and provides it, along with the proper timing and handshaking signals, to a microprocessor based circuit called the Highway Interface Card. This Interface Card has circuitry which interprets and executes the message. It also formats a message to be transmitted and provides it, along with the proper handshaking signals, to the modem.

The three twisted pairs in each of the electrical cables are shown in FIG. 2 as the bidirectional data lines 37 and 38, the ring data lines 34 and 33, and the transmitter active lines 42 and 35. The information which is being tapped off the optical ring via the OEIs is always present on the Ring Data (RD) lines. It is also present on the Bidirectional Data (BD) lines unless one of the modems attached to the cable is transmitting. In that case, the transmitting modem will drive the Transmitter Active (TA) lines high (+ line goes high, − line goes low) and put its message on the BD lines. The TA lines going high will cause each OEI to disable its transmitter and enable its receiver on the BD line. This effectively breaks the repeater action of the OEIs and inserts the transmitting modem into the rings. The modem can transmit into the optical rings and receive its own message, thereby checking continuity of the highway by looking for a "carrier detect" signal on each of its receiver circuits. Note also that in the system described here the modem is usually listening to the BD line and uses the information on the RD line only when transmitting. This allows the stations on the electrical cable to communicate with each other without depending on the continuity of either optical ring.

Figure 3:
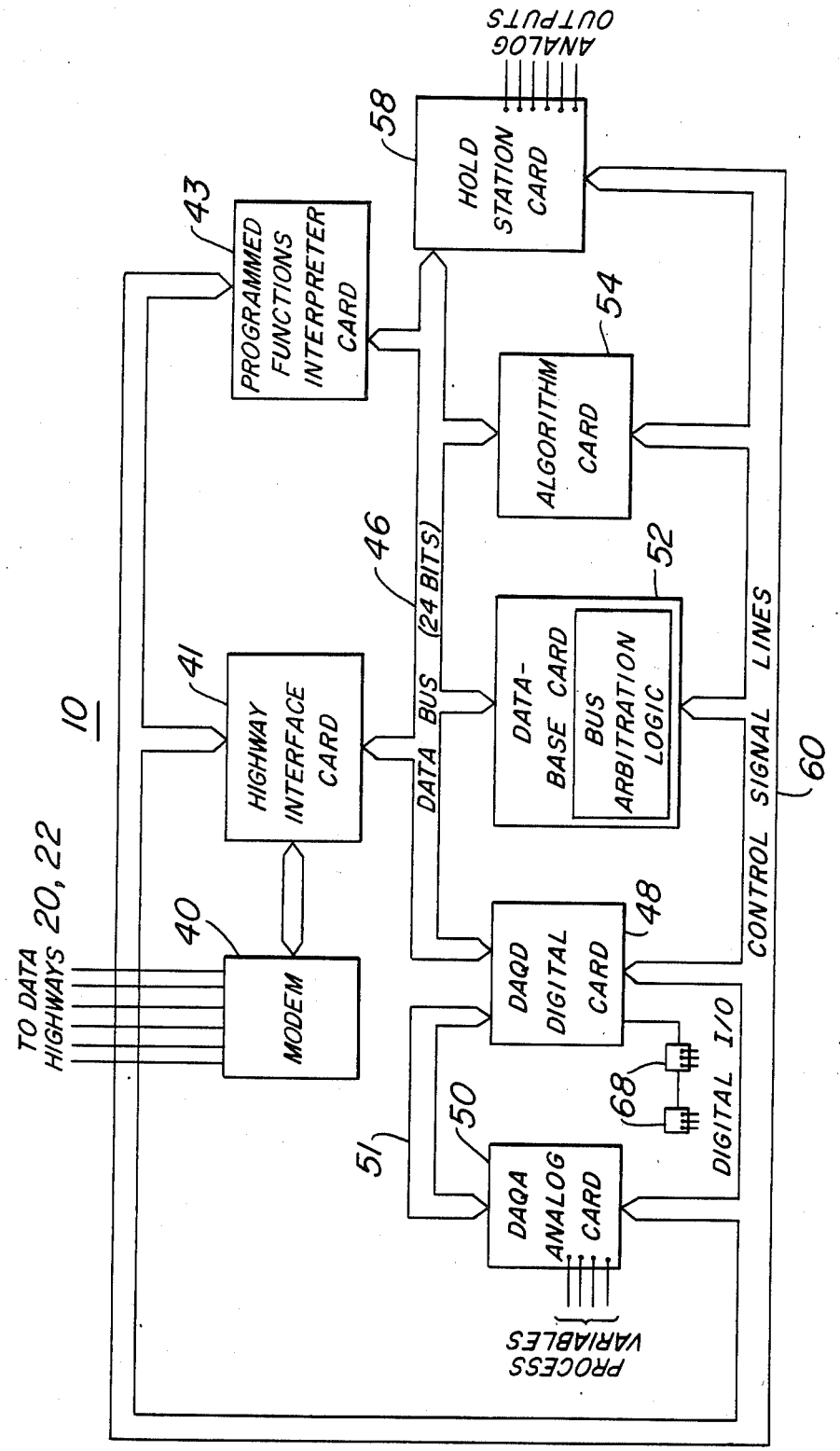
FIG. 3 is a block diagram showing a controller of the system.

Referring to FIG. 3, there is shown in block diagram form an arrangement and interconnection of printed circuit cards having the functions required for a controller, such as controller 10 (FIG. 1) of the present invention. The connection of the controller of FIG. 3 to the data highways 20 and 22 is provided by way of the modem 40, as mentioned above. The modem, of course, serves to convert data from the Highway Interface Card 41 into a modulated signal which may be sent on the data highways and to demodulate signals from the data highways before sending them to the highway interface card. The modem 40 may advantageously be constructed in accordance with the circuit disclosed in U.S. patent application Ser. No. 528,357, filed on Aug. 31, 1983.

The Highway Interface Card 41 receives data from the data bus 46, which is shown as being suitable for carrying 24 bits in parallel. The data bus, of course, serves to provide an intercommunication channel for transferring data between the various printed circuit cards which make up the controller, as shown in FIG. 3. The data bus is connected not only to the Highway Interface Card 41, but also to the Data Acquisition Digital Card (DAQD) 48, the Database Card 52, the Algorithm Card 54, the Hold Station Card 58, and the Programmed Functions Interpreter Card 43. All of these cards must contend for access to the backplane data bus 46. This contention is arbitrated by the bus arbitration logic contained in Database Card 52. For the purposes of this arbitration, the Highway Interface Card should have top priority, the next in line would be the Programmed Functions Interpreter and then the Digital Card followed by the Algorithm Card.

In addition to the connection of the cards 41, 43, 48, and 54 to the data bus 46, there is also a connection of each of those cards to the control signal lines 60 which include all of the various control lines and address lines required to interconnect the various cards to provide the operation of the controller station 10, as here described.

Figure 4:
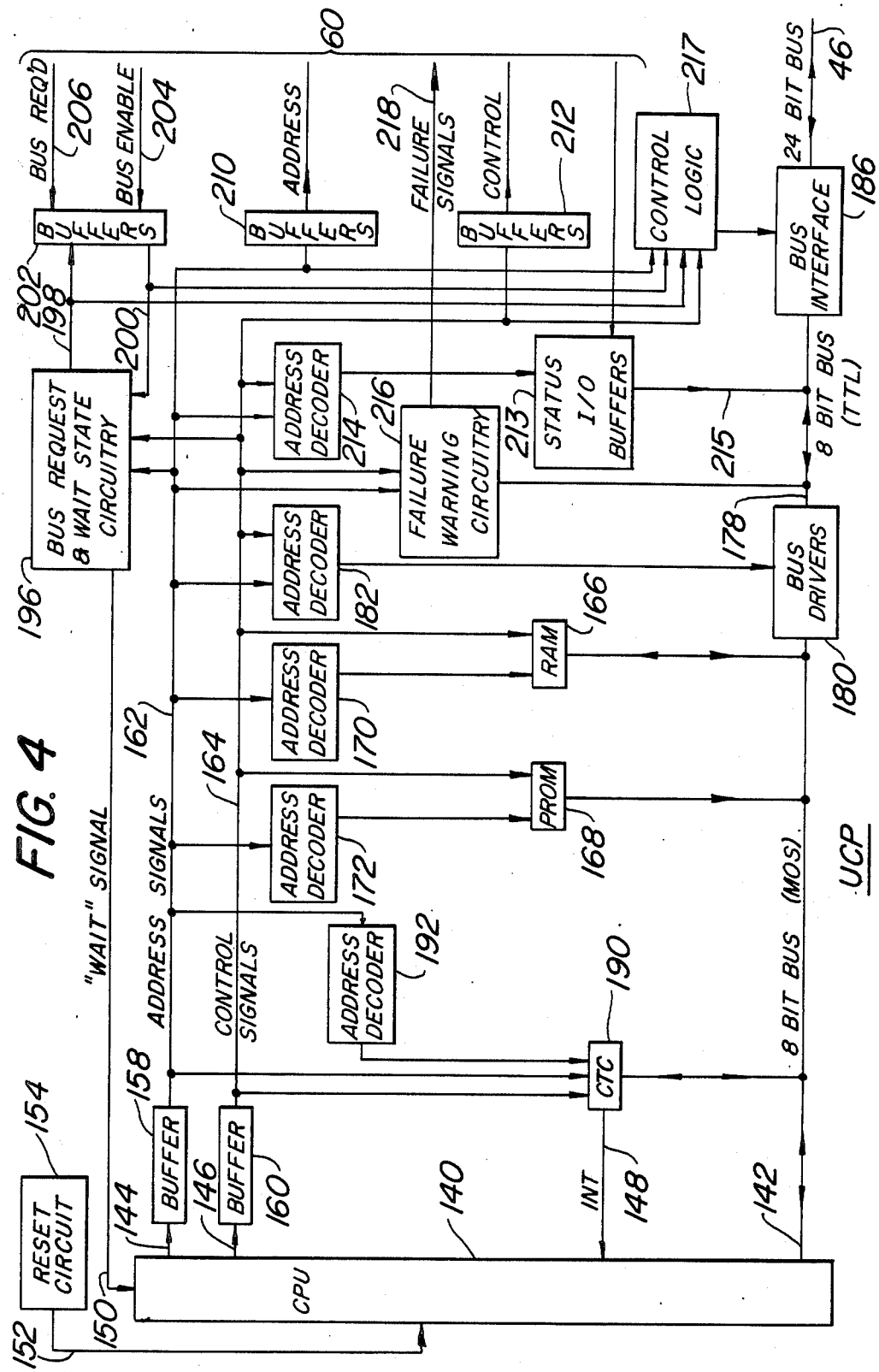
FIG. 4 is a block diagram showing a circuit which may be used for the microprocessor based cards of FIG. 3.

The controller shown in FIG. 3 is similar to the controller shown in FIG. 1 of U.S. Pat. No. 4,417,303, which patent is hereby incorporated by reference into this application. The present FIG. 3, however, uses only one modem and only one Highway Interface Card, for the functions of the two modems and the two Highway Interface Cards of the patent have been combined so that only one of each is required. In addition, a Programmed Functions Interpreter Card has been added to provide for the interpretation of the sequential programs used in the present invention. Also, Digital I/O Terminal Boards 68 are shown for receiving and transmitting to the process digital inputs and outputs. The Algorithm Card, the DAQD Card, the Highway Interface Card, and the Programmed Functions Interpreter Card all have essentially the same circuitry except for certain small differences as may be necessary to do the particular job they are called on to do in the controller. A Universal Controller Processor Card, UCP, which fulfills all of these functions is shown in FIG. 4. This Universal Controller Processor Card has a circuit which is similar to the circuit of FIG. 2 of U.S. Pat. No. 4,417,303 with the additions mentioned above.

Typically all of the microprocessor based cards 41, 43, 48, and 54 interchange data directly with the Database Card 52 over the data bus 46 and do not talk to each other. For example, information as to the numerical values of the process variables is provided to the Database Card 52 over bus 46 from the Digital Card 48 after it has been obtained by the Analog Card 50 directly from the process. This transfer is done periodically in accordance with the timing established for the input scan period by the Digital Card, which serves as the system clock for the controller. Thus, the frequency for scanning the process inputs may be established by DAQD as once every half second, for example. In that case during each half second period all of the process variables received by the Analog Card in their analog form will have been converted to digital form by the Analog Card 50 and transferred from the Analog Card 50 to the Digital Card 48 over bus 51 and thence to the Data Base Card 52, where those input values are stored in the appropriate memory cells to await use in the control process.

The Digital Card also provides, during each scanning period, boolean values as digital inputs and outputs from the digital terminal boards 68. The digital inputs are, like the analog inputs, placed in memory cells in the database for later use in control, when the digital outputs are obtained from the memory cells of the database for output to the process. The analog inputs may, for example, be variables such as temperature, flow, pressure, etc. while the digital inputs may typically be true or false indications as to the condition of certain valves, relays and other process elements which typically have binary states, such as on-off and open-closed. Similarly, the digital outputs may be true or false indications as to the desired condition for those types of elements. Thus, a digital output may close a valve or open a relay in response to output from the Digital Card 48 by way of terminal boards 68.

The timing signals for timing the scan cycles as established by the Digital Card are also transmitted to the Database Card to establish the timing for that card. These timing signals are also monitored by the Algorithm Card. Thus, when the Algorithm Card sees that a new scan cycle has begun it proceeds to process certain information stored in the database in accordance with predetermined algorithms stored in the PROM of the Algorithm Card as part of its library of algorithms.

This library of algorithms may include, for example:
PID CONTROL - proportional, integral, and derivative control with adjustable proportional, reset, and rate values.
ADAPTIVE TUNING - a special form of function generator which dynamically adjusts the tuning parameters of a specified PID CONTROL algorithm.
PARTICIPATION - output operates a number of valves in a specified ratio with any desired bias to maintain a total demand.
SUMMER - provides a conventional four input weighted sum.
MULTIPLIER - forms the product of two inputs.
DIVIDER - divides input 2 by input 1 and adds a bias.
MASS FLOW - computes the mass flow of a compressible fluid.
INTEGRATOR - provides the weighted time integration of inputs.
LEAD/LAG - provides conventional lead/lag action.
TWO POSITION SWITCH - selects as its output one of two inputs.
SEQUENCER - simulates a drum programmer.

By its nature processing by predetermined control algorithms involves the establishment of a number of time slots for each scan cycle. These time slots do not occupy the entire scan period, for part of that period must be taken up with other activity. Typically, for example, there may be 32 slots, each of which is identified with a particular group of memory cells in the database. Each of those groups of memory cells will contain what may be called algorithm information words. These words will among other things provide an identification of the algorithm that is to be used in processing the input data associated with that slot as well as the input data itself and any associated constants required by the algorithm. The results of the algorithm calculations (algorithm outputs) for some of the slots will be outputted to the process as control signals as by way of one or more Hold Station Cards. All algorithm outputs will be stored in the database for use as algorithm inputs in other slots or as program inputs for the programs which will be described later.

There may be, for example, only 16 analog outputs from the Hold Station Card. Thus, only 16 of the 32 slots can be used to provide control signals to individual control loops in the process. The remainder of the slots can be used for auxilliary algorithms, such as for summing, for multiplying or dividing, or for logic functions as may be required in sequencing control and solenoid valve control, or for establishing status messages or interlock conditions.

The Algorithm Card will function during each scan cycle to sequentially execute the algorithms assigned to the slots using that input information from the database which is related to those slots as identified by the algorithm information words. The algorithm outputs from the 16 outputting slots are sent to the Hold Station Card which in turn provides corresponding controller outputs to the process in the form of control signals to the control elements of the 16 loops associated with those slots. The Hold Station Card must have the ability to maintain the output level for the 16 controller outputs even after the input signals to the card have decayed, for it is necessary in the operation of most control elements to maintain the levels of the control signals until the control elements are to be changed for the purpose of varying the controlled variables.

As has been mentioned before, some control algorithms, such as the PID algorithm, efficiently utilize the time period of a slot, in that a number of complex computations are performed. The simple algorithms such as summing, multiplying, and dividing, for example, do not efficiently utilize the slot time. Since only one algorithm can be carried out in each slot, and typically each slot has only one output, it is desirable to find another way of incorporating those simple functions in the control loops. Also, the time slot approach makes the most sense when it is used for the more common control strategies, such as PID control, for with the slot approach it is easier to provide operator visibility and intervention, for canned displays can easily be used to provide the operator with up to date information as to the state of the loop control in any slot. This information will normally be provided to small operator stations which can be located to conveniently follow the controllers operating on a single local highway.

The operator station 12 (FIG. 1) can be used to provide supervisory data collection from any and all of the controllers in the system. In accordance with this invention, the operators station can also be used to create programs which will control some of the 16 loop outputs more efficiently than would be the case if the slot approach was used exclusively. This use of programmed control requires the Programmed Functions Interpreter Card 43 in order to produce from program inputs obtained from the database the program outputs, which may be final controller outputs to a loop or intermediate signals in the calculations. The intermediate signals as well as the final controller outputs obtained by programming are stored in the database for use in controlling the process loops.

The programs are run in the background concurrently with the processing of the algorithms in the slots, which provide the highly visible functions, such as PID control. Thus, the programmed functions provide the supporting background calculations and computations to complete the desired control strategies for the process loops.

The programs are created by operating personnel at the Operator's Station. There the operator enters the program as lines of typed text, using an appropriate high level language such as Fortran or, preferably, EXCEL (available from Leeds & Northrup Co.). Each line of text may consist of one command defining the action to be performed, and arguments specifying the entity or entities to be manipulated (the operands). The basic commands available can, for example, be START, STOP, LET, IF, etc. as well as logic arguments including digital slot output bits, digital I/O, and Alarm/Mode words as well as process analog values, and constants. These programmed functions, therefore, provide a more generalized, free-form control technique, complimentary to slots, and may be viewed as an auxiliary-processor, preprocessor, or post-processor to slots, operating in a background environment. Control strategies which are very logic intensive can, of course, benefit from this combination of the slot and program approach. Also, with this combination distributed controllers can accomplish many of the bulk calculations and interlocks which, heretofore, required the use of a central "host" minicomputer.

The programs, are compiled by the operator to a pseudocode consisting of primitives. These primitives are then interpreted by the Programmed Functions Interpreter Card to produce the program output which is sent to the database. The programs are sequentially run so that the last program statement is always followed by the first. For the purposes of this description an interpreter is a program which takes each instruction, in this case the pseudocode, and causes the computer to go through the steps required to execute the operation. A compiler, on the other hand, translates each statement into the sequence of code, pseudocode in this case, required to execute the operation. The compiler creates an object program in memory by translating the high-level program into a pseudo or intermediate code which the interpreter executes directly as it goes along. Thus, once a program has been compiled it need not be compiled again unless it has been changed, but the pseudocode must be interpreted again each time.

In carrying out this invention, once the editing session which creates the program is completed, the user must compile the program to create an object file of primitives suitable for loading into the database. The non-volatile storage of the programmed functions object file upon being loaded into the database exists in one half of the database, which may be a 4k×24 database module. The other half of the database module contains information on the 32 slots, digital I/O, and inputs.

While the actual number of physical analog inputs may be only 30, for example, there may be storage room for 60 analog values in the database, the second half of these can be thought of as "processed analog values", which may be calculated values from programmed functions. For example, a program may put a calculation result into the database as a "phantom processed analog value", which is then used as a setpoint for a PID algorithm in a particular slot, depending on which algorithm selects that value from memory. Alternatively, a program may put a logic bit into a "Digital I/O" section of the database so that it may be used as an input to an algorithm requiring such a digital input or as a digital output. There may, for example, exist room for storage of 512 bits of digital I/O information in the database. Up to the first half of this may actually be physically embodied in up to 16 terminal boards of 16 bits apiece (such as 68 of FIG. 3). The remainder of the digital I/O is "phantom" digital I/O. Boolean results of the programmed functions may be put into either "real" or "phantom" digital I/O bits.

As an example of the operation of the programmed functions, assume the control to be accomplished involves the opening of a solenoid valve to add water to a process upon the coincidence of two events such as the water level in the process being too low and the valve allowing another material to flow into the process being open. If an open position for the water valve (W.VALVE) will result from a digital output of BIT 1 OF DTB 2 (bit one of digital terminal board two) being true in the boolean sense, and if a low water level, W.LEVEL, corresponds to BIT 2 OF DTB 3 being true, and an open valve, M.VALVE, allowing the other material to flow is indicated by a true for BIT 3 OF DTB 4: then the logic program to accomplish the desired control can be stated as follows, assuming the use of the EXCEL language:

; declare the labels
-W.LEVEL: BIT 2 OF DTB 3
-M.VALVE: BIT 3 OF DTB 4
-W.VALVE: BIT 1 OF DTB 2
; then write the logic program.
LET     :W.VALVE:=:W.LEVEL:     AND :M.VALVE:

Compilation of this logic program will produce the following primitives in the resulting pseudocode:

| PRIMITIVES | DECODE MESSAGE |
|---|---|
| 52 21 | [get BIT 2 OF DTB 3] |
| 52 32 | [get BIT 3 OF DTB 4] |
| 31 | [AND] |
| 54 10 | [put result in BIT 1 OF DTB 2] |

The primitive packets shown on each line above consist of at least a one byte code, such as 52, as a hex number between OO and FF which determines the operation that is to be performed. Some primitive packets contain a second byte or more, such as 21, as additional information to complete the operation for the primitive as by indicating the bit and digital terminal board identifying the location in the database for that information. The primitive packets are placed one after another in the database so that a program flow is formed.

These primitives will be loaded into the database so that they are available for all future executions of the progammed functions. For such execution, the primitives will be interpreted by the Programmed Functions Interpreter Card in sequence with other similar programs. The result of the interpretation will be put in the memory cell identified as BIT 1 OF DTB 2. Then when digital outputs are being processed the boolean value in that location will be outputted to the water valve control circuit by way of the corresponding physical terminal board location to open the valve when the water level is below the desired level at the same time that the other material is flowing through its open valve. Alternatively, of course, the result of the ANDing could have been stored as a phantom digital I/O bit for use as an input to one of the slots or for use in another program.

As was mentioned previously, the half of the database which contains the information for the slots is highly organized. For example, individual blocks of memory cells in this area of the database are specifically identified with a particular slot. Each of those blocks and hence each slot has associated with it analog input information as well as slot (algorithm) information which forms the algorithm information words. The layout of this information for individual blocks may, for example, comprise a first area (address 0-24) having analog information followed by slot information (address 25-EO) which in turn is followed by auxiliary analog information (address EO-FF). Each block, which may be considered a slot table, uses 100 H address locations and each block, therefore, begins at a multiple of 100 H.

The analog information may include input values, high and low limit values, high and low alarm limits, input status information, input units of measure, filter time constants, and configuration words which store information as to the mode of control. The algorithm related information then provides information identifying the inputs to be used with the algorithm, the constants to be used, and the output locations.

With the highly organized format described above it will be evident that the information needed to execute a certain algorithm for a particular slot can always be found in the same place in the database. Such a highly organized database is an important element in carrying out the present invention which allows the programmed functions to produce outputs which can be used in slot processing and vice versa.

The circuits of the blocks 41, 43, 48, and 54 of FIG. 3 are shown in block diagram form in FIG. 4 as the Universal Controller Processor Card (UCP). This circuit is described in U.S. Pat. No. 4,417,303, previously referenced. However, the reference numerals in the present FIG. 4 have been increased by the addition of 100 to the reference numerals of FIG. 2 of the patent, with the exception of the data bus identification. The element that appears as ROM 66 in the patent has been corrected to be a RAM which is here identified as 166. The PROM 168 may be a ROM, if desired.

The central processing unit 140 may, for example be a Z80 CPU as manufactured by Zilog. Likewise, counting and timing functions may be provided by a Z80 CTC. The PROM or ROM is used to store the operating firmware of the card and the RAM is used to store temporary variables, the CPU stack, etc. The Bus Interface allows the card to use the backplane data, address, and control buses in order to read and write to the resource cards ( the Database and Hold Station).

Communications with the resource cards occurs over the 24 bit data bus 46. This bus is buffered and interfaced with the on card 8 bit data bus 178 by bus interface 186. Also involved in communication between the card and the Database and Hold Station Cards are address buffers 210, along with the Bus Request and Wait State Circuitry 196. The performance of reads and writes is fully described in U.S. Pat. No. 4,417,303. Communications over the buses also involves the sharing of the buses since several cards in the controller require the use of the buses. To accomplish this sharing bus arbitration logic is provided in the Database as previously mentioned. When the UCP card needs to use the backplane bus, the bus request circuitry issues a request to the database on line 206. The database returns permission to use the backplane bus on line 204 and the wait state circuitry simultaneously inserts wait states into the CPU 140 so that the Hold Station or Database has enough time to perform the read or write requested.

The UCP card performs diagnostic functions with status I/O signals from the backplane (not shown) which are buffered by the Status I/O Buffers 213 and are then sent to the TTL data bus so the CPU may read them when it is performing diagnostic checks.

Circuitry is also devoted to warnings against card and system failure. This circuitry is shown as Failure Warning Circuitry 216 and includes parity checking circuitry as well as dead-man timer circuitry.

Other circuitry which appears on the UCP Card includes the clock circuit (not shown) and the reset circuit. Each processor card in the controller has its own clock so that a failure on one card will not affect other cards. The Reset Circuit 154 includes a signal from the backplane, which is a master clear signal. This signal is routed to all processor cards in the controller from the database and thus allows a simultaneous reset of all cards.

As shown in FIG. 4, the address signals on bus 162 as derived from the CPU 140 over line 144 and by way of Buffer 158 are decoded by the several Address Decoders 170, 172, 182, 192, and 214 to provide the decoded addresses to the RAM, PROM, The Bus Driver 180, The CTC, and the Status I/O Buffers 213, respectively.

Control signals as required to carry out the functions of the UCP Card, as described herein, are supplied by the CPU 140 over lines 146 and through Buffer 160 to the control signal bus 164 and thence to all of the other circuits on the card, including the Control Logic 217 which controls the Bus Interface 186 as described in full in the referenced patent. The necessary control signals are also communicated to other card by way of the Buffers 212.

What is claimed is:

1. A method for carrying out the control of a process using a plurality of control loops in a digital distributed automatic process control system which has controllers at each of a plurality of distributed control locations and wherein each controller receives during consecutive time slots of a scan cycle inputs from the process representing measured values of process variables to be controlled by the control loops at that location and which produces controller outputs to control elements of the loops at that location as required to control the process variables in accordance with predetermined control strategies, comprising the steps of:

providing a database having a plurality of memory cells for storing numerical and boolean values for use in the control of said loops;

providing in firmware a library of frequently used control algorithms;

introducing inputs for each controller during each scan cycle to a memory cell of said database for use as a program input or as an algorithm input;

automatically executing in sequence during each time slot a selected one of said algorithms to produce an algorithm output for each slot in accordance with the predetermined function of the associated algorithm as applied to algorithm inputs associated with that slot and obtained as values from said database;

automatically running operator established sequential programs concurrently with execution of the slot algorithms to provide program outputs to the database having functional relationships to program inputs obtained as values from the database, said functional relationship being as established by said programs; and selectively introducing each algorithm output and program output to either a control loop as a controller output to control the process or to a memory cell in said database as a value for use as an algorithm input for another slot or as a program input for another program;

whereby the control elements of the process are controlled in accordance with the desired strategy as established by said algorithms for said time slots and by said sequential programs 2. The method of claim 1 in which the database is provided with one part wherein are stored slot tables, and another part devoted to supporting the programmed functions.

* * * * *